United States Patent
Ikoma et al.

(10) Patent No.: US 7,799,847 B2
(45) Date of Patent: Sep. 21, 2010

(54) WATER-BASED INK COMPOSITION FOR WRITING INSTRUMENTS

(75) Inventors: Hideyuki Ikoma, Yokohama (JP); Yusuke Kobayashi, Yokohama (JP)

(73) Assignee: Mitsubishi Pencil Co., Ltd., Shinagawa-Ku, Tokyo (JP)

(*) Notice: Subject to any disclaimer, the term of this patent is extended or adjusted under 35 U.S.C. 154(b) by 767 days.

(21) Appl. No.: 11/337,485

(22) Filed: Jan. 24, 2006

(65) Prior Publication Data

US 2006/0173094 A1 Aug. 3, 2006

(30) Foreign Application Priority Data

Jan. 28, 2005 (JP) .............................. 2005-020778

(51) Int. Cl.
*C09D 11/00* (2006.01)

(52) U.S. Cl. ...................... 523/160; 523/161; 524/317; 106/31.28; 401/209

(58) Field of Classification Search .................... 106/20; 523/160, 161
See application file for complete search history.

(56) References Cited

U.S. PATENT DOCUMENTS

| | | | | |
|---|---|---|---|---|
| 5,281,262 A * | 1/1994 | Saito | ........................ | 523/161 |
| 6,264,729 B1 * | 7/2001 | Miyamoto et al. | ....... | 106/31.36 |
| 6,613,135 B1 * | 9/2003 | Miyamoto et al. | ....... | 106/31.35 |
| 6,637,875 B2 * | 10/2003 | Kaneko et al. | .............. | 347/100 |
| 6,749,355 B2 * | 6/2004 | Payne et al. | ................. | 401/195 |
| 2003/0196568 A1 * | 10/2003 | Miyamoto et al. | ....... | 106/31.58 |
| 2004/0040466 A1 * | 3/2004 | Aoyama et al. | .......... | 106/31.52 |

FOREIGN PATENT DOCUMENTS

| | | |
|---|---|---|
| CN | 1122692 C | 7/1998 |
| EP | 0 937 758 A1 * | 8/1999 |
| JP | 02-038474 A | 2/1990 |
| JP | 05-186730 A | 7/1993 |
| JP | 2005-60681 * | 3/2005 |

OTHER PUBLICATIONS

Machine translation of JP 2005-60681.*

* cited by examiner

*Primary Examiner*—Vasu Jagannathan
*Assistant Examiner*—Doris L Lee
(74) *Attorney, Agent, or Firm*—Buchanan Ingersoll & Rooney PC

(57) ABSTRACT

Provided is a water-based ink composition for a writing instrument comprising at least a colorant and water, characterized by comprising an alkylene oxide-added glycerin ester in which a principal skeleton is glycerin and 60 to 150 moles of alkylene oxide is added thereto and in which the glycerin is ester-bonded with a carboxylic acid-containing substance in an amount of 0.1 to 30% by weight based on the total amount of the ink composition.

7 Claims, No Drawings

WATER-BASED INK COMPOSITION FOR WRITING INSTRUMENTS

TECHNICAL FIELD

The present invention relates to a water-based ink composition for a writing instrument, more specifically to a water-based ink composition for a writing instrument which is excellent in a non-feathering property, writing feeling and physical property stability.

BACKGROUND ART

When preparing water-based inks for writing instruments, particularly when preparing inks falling in a low viscosity area (50 mPa·s or less: measured (25° C.) by means of an ELD type viscometer manufactured by Tokimec Inc.), a kind and an addition amount of material having a large penetrating rate into paper such as a surfactant having a low molecular weight have so far been restricted because a non-feathering property can not be expected.

In particular, in the case of a specification in which a metal lubricity between a ball and a tip holder is required as is the case with a ballpoint pen, a surfactant has to be indispensably added. However, addition of a surfactant of an amount which is enough for satisfying the metal lubricity results in deteriorating the non-feathering property.

Also, in the case of a structure requiring no metal lubricity as is the case with a marking pen, there is the problem that the drawn lines are blurred by an effect brought about by an emulsifier contained in a colored emulsion which is used as a colorant.

Further, it is possible to improve a non-feathering property by making an ink viscosity to be a non-Newtonian viscosity. Particularly in the case of a pigment ink, the drawn lines have a good quality, but color separation is caused by settling of the pigment with the passage of time at high temperature depending on the kind of a non-Newtonian viscosity-providing agent; while no problems are involved in settling of the pigment with the passage of time at high temperature, blobbing and splitting in the drawn lines are brought about, and the drawn lines are reduced in a quality; and the writing feeling is not improved even by adding a low molecular surfactant. Thus, there exists the problem that all qualities can not be satisfied at the same time.

On the other hand, known is a pigment ink for a ballpoint pen which comprises at least a pigment, water, a water-soluble organic solvent and a water-soluble polymer as a viscosity-controlling agent and in which an ink viscosity falls in a range of 50 to 2000 mPa·s (25° C.), wherein a specific polyglycerin fatty acid ester such as hexaglycerin monolaurate is added thereto, whereby the pigment ink is provided together with the characteristics of an oil-based ink and a water-based ink for a ballpoint pen, and it is less reduced in pigment dispersion stability with the passage of time (for example, Japanese Patent Application Laid-Open No. 38474/1990).

However, in the above pigment ink for a ballpoint pen described in Japanese Patent Application Laid-Open No. 38474/1990, the specific polyglycerin fatty acid ester such as hexaglycerin monolaurate functions as a pigment dispersant, and the ink is still inferior in terms of writing feeling, a non-feathering property and a drawn line-drying property.

Further, known is a water-based pigment ink composition for a ballpoint pen characterized by comprising at least a kind of alkylene oxide adduct of polyhydric alcohol selected from the group consisting of alkylene oxide adducts of polyglycerin, alkylene oxide adducts of glycerin in which 1 to 150 moles of alkylene oxide are added to glycerin, alkylene oxide adducts of trimethylolpropane and mixtures thereof, a pigment, a dispersant and water, and the ink composition makes the written lines less liable to cause feathering, has a satisfactory lubricity and provides good writing feeling (for example, Japanese Patent Application Laid-Open No. 186730/1993). In the above water-based pigment ink composition for a ballpoint pen described in Japanese Patent Application Laid-Open No. 186730/1993, the foregoing alkylene oxide adduct of polyhydric alcohol to which a fatty acid as a hydrophobic group is not bonded has a purpose of improving lubricity, and therefore the ink composition is still inferior in terms of writing feeling, a non-feathering property and a drawn line-drying property.

DISCLOSURE OF THE INVENTION

In light of the problems on the prior art described above, the present invention intends to solve them, and an object thereof is to provide a water-based ink composition for a writing instrument in which ink physical properties are not changed with the passage of time even after stored for a long period of time and which is excellent in writing feeling, a non-feathering property and a drawn line-drying property.

Intensive investigations on the foregoing problems carried out by the present inventors have resulted in finding that a water-based ink composition for a writing instrument which meets the object described above can be obtained by adding a specific alkylene oxide-added glycerin ester to an ink composition for a writing instrument comprising at least a colorant and water in an amount falling in a specific range based on the total amount of the ink composition, and thus the present invention has come to be completed.

That is, the present invention comprises the following items (1) to (10).

(1) A water-based ink composition for a writing instrument comprising at least a colorant and water, characterized by comprising an alkylene oxide-added glycerin ester in which a principal skeleton is glycerin and 60 to 150 moles of alkylene oxide is added thereto and in which the glycerin is ester-bonded with a carboxylic acid-containing substance in an amount of 0.1 to 30% by weight based on the total amount of the ink composition.

(2) The water-based ink composition for a writing instrument as described in the above item (1), wherein the glycerin is mono- or polyglycerin having a polymerization degree of 1 to 10.

(3) The water-based ink composition for a writing instrument as described in the above item (1) or (2), wherein the alkylene oxide-added glycerin ester has an average molecular weight of 2800 to 10000.

(4) The water-based ink composition for a writing instrument as described in any one of the above items (1) to (3), wherein the alkylene oxide-added glycerin ester has an HLB of 15 to 19.5.

(5) The water-based ink composition for a writing instrument as described in any one of the above items (1) to (4), wherein the carboxylic acid-containing substance is fatty acid having 4 to 25 carbon atoms or an aromatic carboxylic acid.

(6) The water-based ink composition for a writing instrument as described in any one of the above items (1) to (5), wherein the alkylene oxide in the alkylene oxide-added glycerin ester is ethylene oxide.

(7) The water-based ink composition for a writing instrument as described in any one of the above items (1) to (6), wherein in the alkylene oxide-added glycerin ester, X/(Y+2) is 0.25 to 0.75, wherein X is a number of molecules of the carboxylic acid-containing substance bonded to the glycerin, and Y is a polymerization degree of glycerin.

(8) The water-based ink composition for a writing instrument as described in any one of the above items (1) to (7), containing an organic solvent of 0.1 to 30% by weight based on the total amount of the ink composition.

(9) The water-based ink composition for a writing instrument as described in any one of the above items (1) to (8), containing saccharides of 0.1 to 30% by weight based on the total amount of the ink composition.

(10) A writing instrument filled with the water-based ink composition for a writing instrument as described in any one of the above items (1) to (9).

"HLB" prescribed in the present invention is calculated from a Griffin's equation shown below.

$$HLB = [\text{molecular weight of a hydrophilic group part} / \text{molecular weight of a surfactant (or molecular weight of the alkylene oxide-added glycerin ester)}] \times (100/5)$$

According to the present invention, provided is a water-based ink composition for a writing instrument in which ink physical properties are not changed with the passage of time even after stored for a long period of time and an aging stability is excellent and which is excellent as well in writing feeling, a non-feathering property and a drawn line-drying property.

BEST MODE FOR CARRYING OUT THE INVENTION

The embodiment of the present invention shall be explained below in details.

The water based ink composition for a writing instrument according to the present invention comprises at least a colorant and water, characterized by comprising an alkylene oxide-added glycerin ester in which a principal skeleton is glycerin and 60 to 150 moles of alkylene oxide is added thereto and in which the glycerin is ester-bonded to a carboxylic acid-containing substance in an amount of 0.1 to 30% by weight based on the total amount of the ink composition.

The above alkylene oxide-added glycerin ester is added in order to improve the writing feeling, the non-feathering property and the drawn line-drying property without changing the ink physical properties with the passage of time even after stored for a long period of time.

The alkylene oxide-added glycerin ester used in the present invention is obtained by reacting a carboxylic acid-containing substance with an adduct prepared by adding 60 to 150 moles of alkylene oxide to 1 mole of mono- or poly-glycerin (hereinafter referred to merely as polyglycerin) having a polymerization degree of 1 to 10.

In the present invention, the polyglycerin, which is the glycerin skeleton, has a polymerization degree of preferably 1 to 10, more preferably 2 to 8 and particularly preferably 2 to 6 in terms of further enhancing the effects of the present invention. If this polymerization degree exceeds 10, a bulkiness of the whole of the molecules grows large, and the writing feeling and the non-feathering property of the drawn lines are improved. However, the drawn lines are less liable to be dried, and as a result, problems such as staining of a hand are brought about.

In the present invention, the alkylene oxide used shall not specifically be restricted and includes at least one of ethylene oxide, propylene oxide, butylene oxide and the like (each alone or combination of two or more kinds thereof; hereinafter the same shall apply), and ethylene oxide is preferred from the viewpoint of hydrophilicity of the alkylene oxide.

An addition mole number of the alkylene oxide is preferably 60 to 150 moles, more preferably 65 to 120 moles per mole of polyglycerin.

If the addition mole number is less than 60 moles, the non-feathering property is reduced, and the writing feeling can not be expected to be significantly improved because of a low swelling degree of a paper surface. Further, when used for a pigment ink, the dispersibility is reduced.

On the other hand, if the addition mole number exceeds 150 moles, the ink viscosity goes up, and therefore the content of the alkylene oxide-added glycerin ester has to be decreased when designing particularly a low viscosity ink. Accordingly, the intended writing feeling and non-feathering property can not be exhibited. Further, when used for a pigment ink, if the content of the ester is increased in order to secure the pigment dispersion stability, the ink is unavoidably increased in a viscosity. As a result, the content also has to be decreased, and the dispersion stability can not be secured. Further, in an ink having a shear thinning property, the decrease of the ester content works in a direction of reducing the shear thinning property in a rheology characteristic thereof, and the desired viscosity can not be obtained in a standing still state. As a result, the pigment settles down with the passage of time.

In the present invention, the carboxylic acid-containing substance used shall not specifically be restricted as long as it contains carboxylic acid and includes, for example, at least one of fatty acids and aromatic carboxylic acids.

The fatty acid used may be any of linear or branched, saturated or unsaturated fatty acids and is preferably a fatty acid having 4 to 25 carbon atoms, more preferably a fatty acid having 8 to 20 carbon atoms from the viewpoint of further rise in the effects of the present invention, and it includes, for example, capric acid, lauric acid, tridecylic acid, myristic acid, palmitic acid, stearic acid, hydroxystearic acid and oleic acid.

The aromatic carboxylic acid includes benzoic acid, α-naphthalenecarboxylic acid, β-naphthalenecarboxylic acid, 1,4-naphthalenedicarboxylic acid and 2,6-naphthalenedicarboxylic acid, and it may be carboxylic acid having a substituent such as an alkyl group, a halogen atom and an alkoxy group.

When it is a fatty acid having less than 4 carbon atoms, the hydrophilicity occupied in the molecule grows relatively high, and the drawn line-drying property is reduced in a certain case. Further, when it is added to a pigment ink, the adsorption ability onto the pigment is lowered, and therefore the pigment dispersibility is reduced in a certain case. On the other hand, when it is a fatty acid in which carbon atoms exceed 25, the ink viscosity goes up as is the case with an addition mole number of alkylene oxide, and restriction is placed in terms of an ink viscosity design.

In the alkylene oxide-added glycerin ester according to the present invention, X/(Y+2), that is, an esterification degree (number of esters/number of hydroxyl groups) is preferably 0.25 to 0.75, more preferably 0.25 to 0.70 and particularly preferably 0.30 to 0.60 from the viewpoint of design for the hydrophilicity of the molecule, the adsorption ability on the pigment and the ink viscosity, wherein X is a mole number of the carboxylic acid-containing substance bonded to 1 mole of polyglycerin, and Y is a polymerization degree of glycerin.

The alkylene oxide-added glycerin ester according to the present invention is obtained, as described above, by reacting the carboxylic acid-containing substance with an adduct of 60 to 150 moles of alkylene oxide to polyglycerin having a polymerization degree of 1 to 10 and wherein a principal skeleton thereof comprises the polyglycerin; 60 to 150 moles of alkylene oxide is added to 1 mole thereof; it is ester-bonded with a carboxylic acid-containing substance; and the alkylene oxide-added glycerin ester has an HLB of preferably 15 to 19.5, more preferably 16 to 19.5.

If the HLB is less than 15, an addition mole number of alkylene oxide is small, and the proportions of an alkyl group and an aromatic group in one molecule grow large, so that reduction in the writing feeling is brought about. Further, in the case of a pigment ink, reduction in the dispersion stability is brought about. On the other hand, if the HLB exceeds 19.5, an addition mole number of alkylene oxide tends to be increased, and therefore restriction in terms of an ink viscosity design is placed by a rise in the ink viscosity.

The alkylene oxide-added glycerin ester according to the present invention has an average molecular weight of preferably 2800 to 10000, more preferably 3000 to 9000. If the average molecular weight is less than 2800, reduction in the drawn line-drying property is brought about by shortage in a hydrophobic group corresponding to a component penetrating into a paper surface, and in the case of a pigment ink, pigment dispersibility is inferior. On the other hand, if the average molecular weight exceeds 10000, restriction in terms of an ink viscosity design is placed by a rise in the ink viscosity.

The specifically usable alkylene oxide-added glycerin ester includes, for example, at least one of glycerin EO (60) lauric acid (1) ester [EO: ethylene oxide, EO (60) shows addition of EO 60 moles and lauric acid (1) means lauric acid 1 ester; hereinafter the same shall apply], diglycerin EO (100) palmitic acid (2) ester, diglycerin EO (100) oleic acid (2) ester, diglycerin EO (120) benzoic acid (2) ester, diglycerin EO (100) butyric acid (2) ester, diglycerin EO (100) tridecylic acid (2) ester, triglycerin EO (80) stearic acid (2) ester, triglycerin EO (150) palmitic acid (2) ester, tetraglycerin EO (80) lauric acid (1) ester, tetraglycerin EO (80) lauric acid (5) ester, Y=10 glycerin EO (60) lauric acid (4) ester, Y=11 glycerin EO (85) lauric acid (4) ester, glycerin EO (60) PO (10) (PO: propylene oxide; hereinafter the same shall apply) tridecylic acid (1) ester and diglycerin EO (75) behenic acid (1) ester.

A content of the alkylene oxide-added glycerin ester according to the present invention is preferably 0.1 to 30% by weight, more preferably 0.5 to 20% by weight and particularly preferably 1 to 10% by weight based on the total amount of the ink composition.

If the above content is less than 0.1% by weight, the writing feeling is not improved. On the other hand, if it exceeds 30% by weight, a viscosity grows high in the case of a Newtonian ink, and the targeted viscosity can not be set up. Further, in the case of a non-Newtonian ink, a content of a non-Newtonian property-providing agent has to be restricted in setting to the targeted viscosity. As a result, the network structure does not become firm, and problems such as settling of the pigment are brought about.

The colorant used in the present invention shall not specifically be restricted, and capable of being used are optional compounds selected from inorganic and organic pigments, water-soluble dyes and oil-soluble dyes dissolved in water at a low concentration, which have so far conventionally been used for water-based ink compositions for writing instruments.

When using the oil-soluble dyes, the dyes can be improved in solubility by dissolving an organic solvent in a vehicle.

The inorganic pigments include, for example, titanium oxide, carbon black and metal powders, and the organic pigments include, for example, azo lake, insoluble azo pigments, chelate azo pigments, phthalocyanine pigments, perylene and perinone pigments, anthraquinone pigments, quinacridone pigments, dye lakes, nitro pigments and nitroso pigments.

To be specific, capable of being used are phthalocyanine blue (C. I. 74160), phthalocyanine green (C. I. 74260), hansa yellow 3G (C. I. 11670), disazo yellow GR (C. I. 21100), naphthol red (C. I. 12390), permanent red 4R(C. I. 12335), brilliant carmine 6B (C. I. 15850) and quinacridone red (C. I. 46500).

All of direct dyes, acid dyes, food dyes and basic dyes can be used for the water-soluble dyes.

The examples of the direct dyes shall be described below. They include C. I. direct black 17, ditto 19, ditto 22, ditto 32, ditto 38, ditto 51 and ditto 71, C. I. direct yellow 4, ditto 26, ditto 44 and ditto 50, C. I. direct red 1, ditto 4, ditto 23, ditto 31, ditto 37, ditto 39, ditto 75, ditto 80, ditto 81, ditto 83, ditto 225, ditto 226 and ditto 227 and C. I. direct blue 1, ditto 15, ditto 71, ditto 86, ditto 106 and ditto 119.

The examples of the acidic dyes shall be described below. They include C. I. acid black 1, ditto 2, ditto 24, ditto 26, ditto 31, ditto 52, ditto 107, ditto 109, ditto 110, ditto 119 and ditto 154, C. I. acid yellow 7, ditto 17, ditto 19, ditto 23, ditto 25, ditto 29, ditto 38, ditto 42, ditto 49, ditto 61, ditto 72, ditto 78, ditto 110, ditto 127, ditto 135, ditto 141 and ditto 142, C. I. acid red 8, ditto 9, ditto 14, ditto 18, ditto 26, ditto 27, ditto 35, ditto 37, ditto 51, ditto 52, ditto 57, ditto 82, ditto 87, ditto 92, ditto 94, ditto 111, ditto 129, ditto 131, ditto 138, ditto 186, ditto 249, ditto 254, ditto 265 and ditto 276, C. I. acid violet 15 and ditto 17, C. I. acid blue 1, ditto 7, ditto 9, ditto 15, ditto 22, ditto 23, ditto 25, ditto 40, ditto 41, ditto 43, ditto 62, ditto 78, ditto 83, ditto 90, ditto 93, ditto 103, ditto 112, ditto 113 and ditto 158 and C. I. acid green 3, ditto 9, ditto 16, ditto 25 and ditto 27.

Most of the food dyes are included in the direct dyes or the acidic dyes, and one example which is not included therein includes C. I. food yellow 3.

The examples of the basic dyes shall be described below. They include C. I. basic yellow 1, ditto 2 and ditto 21, C. I. basic orange 2, ditto 14 and ditto 32, C. I. basic red 1, ditto 2, ditto 9 and ditto 14, C. I. basic violet 1, ditto 3 and ditto 7, C. I. basic green 4, C. I. basic brown 12 and C. I. basic black 2 and ditto 8.

The oil-soluble dyes include, for example, Valifast Black 1802, Valifast Black 1807, Valifast Violet 1701, Valifast Violet 1702, Valifast Blue 1601, Valifast Blue 1603, Valifast Blue 1605, Valifast Red 1308, Valifast Red 1320, Valifast Red 1355, Valifast Red 1360, Valifast Yellow 1101, Valifast Yellow 1105, Valifast Green 1501, nigrosine base EXBP, nigrosine base EX, BASE OF BASIC DYES ROB-B, BASE OF BASIC DYES RO6G-B, BASE OF BASIC DYES VB-B, BASE OF BASIC DYES VPB-B and BASE OF BASIC DYES MVB-3 (all above manufactured by Orient Chemical Industries Ltd.), Aizen spilon Black GMH-special, Aizen spilon Violet C-RH, Aizen spilon Blue GNH, Aizen spilon Blue 2BNH, Aizen spilon Blue C-RH, Aizen spilon Red C-GH, Aizen spilon Red C-BH, Aizen spilon Yellow C-GNH, Aizen spilon Yellow C-2 GH, S.P.T Red 522, S.P.T Blue 111, S.P.T Blue GLSH special, S.P.T Red 533, S.P.T Orange 6, S.B.N Violet 510, S.B.N Yellow 510 and S.B.N Yellow 530 (all above manufactured by Hodogaya Chemical Co., Ltd.).

The above colorants may be used alone or in combination of two or more kinds thereof.

A content of the above colorants falls in a range of usually 0.05 to 30% by weight, preferably 1 to 15% by weight based on the total amount of the ink composition.

If a content of the colorant exceeds 30% by weight, the pigment is coagulated or the dye is deposited when stored over a long period of time to clog a pen tip, which results in causing inferior writing. On the other hand, if it is less than 0.05%, coloring is weakened, and the hue in writing on paper is uncertain. Accordingly, both the ranges are not preferred.

A pH of the water-based ink composition of the present invention is preferably controlled to a pH falling in a range of 7 to 10 (measuring temperature: 25° C., measuring instrument: a pH meter manufactured by HORIBA, Ltd.). In the case where a writing instrument is, for example, a ballpoint pen, a pH of the ink composition is controlled in the range described above in order to not only prevent a metallic ballpoint pen tip from being corroded but also prevent a dispersant used for dispersing a pigment from being coagulated and an acid dye used as a colorant from not being dissolved. For example, a ballpoint pen tip is usually constituted from a ball and a holder, and when at least a part thereof is constituted of metal, attentions have to be paid to rust. In the case of a water-based ink as is the case with the present invention, rust preventive measure is an essential condition. For example, when conventional tungsten carbide is used as a material for a ballpoint pen tip, an adverse effect on the writing performance due to elution of cobalt and tungsten is not exerted as long as the pH falls in the range described above.

The water-based ink composition of the present invention can be used in a wide area of a viscosity. In the case of a low viscosity ink having a Newtonian ink viscosity of 1 to 10 mPa·s, effects are observed in a non-feathering property and writing feeling. In the case of an ink having a viscosity of 10 to 100 mPa·s, the same effects as in the low viscosity ink can be expected as well. In the case of a non-Newtonian viscosity ink having an ink viscosity of 100 to 4000 mPa·s at a shear rate of 3.84 $s^{-1}$, a firm network structure is constructed with a non-Newtonian property-providing agent, and the physical properties can be stabilized.

A surface tension of the water-based ink composition of the present invention is preferably suitably set up in a range of about 16 to about 45 mN/m (measuring temperature: 25° C., measuring device: surface tension measuring meter manufactured by Kyowa Interface Science Co., Ltd.).

For example, when the water-based ink composition of the present invention is used for a writing instrument of a free ink, direct storage type described later in the form of a low viscosity ink having a viscosity of 1 to 10 mPa·s (25° C.), a surface tension of the ink is controlled to preferably about 35 to about 45 mN/m, more preferably about 37 to 42 mN/m and particularly preferably about 38 to about 40 mN/m in order to maintain the quality of the pen. When used for a writing instrument of a sliver type described later at the same viscosity, a surface tension of the ink is controlled to preferably about 25 to about 40 mN/m, more preferably about 27 to about 38 mN/m and particularly preferably about 30 to about 36 mN/m in order to maintain the quality of the pen.

In the writing instruments of the respective types described above, if the surface tensions of the inks each fall below the preferred ranges described above, the drawn lines are liable to be blurred, and adverse effects (leaking, blowing and the like) are exerted on the quality of the pen in a certain case. On the other hand, if the surface tensions each exceed the preferred ranges described above, the pen is reduced in writing feeling and discharge amount stability in a certain case.

On the other hand, when the water-based ink composition of the present invention is provided with a shear thinning property to prepare an intermediate viscosity ink having a viscosity of 100 to 4000 mPa·s (25° C.) at a shear rate of 3.84 $s^{-1}$ or when a Newtonian viscosity ink having a viscosity of 10 to 100 mPa·s (25° C.) is prepared, the surface tension is controlled so that it falls in a range of preferably about 16 to about 38 mN/m, more preferably about 17 to about 35 mN/m and particularly preferably about 20 to about 33 mN/m.

If the surface tension is less than 16 mN/m, a leaking phenomenon is liable to be caused, and the pigment is liable to be settled down and coagulated. On the other hand, if it exceeds 38 mN/m, a blobbing phenomenon and a splitting phenomenon are liable to be caused, and the ink discharge amount becomes unstable depending on a storing environment and a writing state, so that density and a width of the drawn lines are liable to be scattered in a certain case.

In the water based ink composition for a writing instrument according to the present invention, a water-soluble organic solvent can be used, if necessary, as a humectant for preventing the pen tip from drying. The water-soluble organic solvent includes, for example, water-soluble polyhydric alcohols such as ethylene glycol, propylene glycol, diethylene glycol and glycerin, cellosolves such as ethylene glycol monomethyl ether (methyl cellosolve) and ethylene glycol monoethyl ether (ethyl cellosolve), carbitols such as diethylene glycol monomethyl ether (methyl carbitol) and diethylene glycol monoethyl ether (ethyl carbitol) and glycol ether esters such as ethylene glycol monoethyl ether acetate. Further, derivatives of glycerin, diglycerin and polyglycerin can be added to the ink for the purpose of obtaining the same effects as those of the organic solvents because of the moisture holding effect thereof.

A content of the above water-soluble organic solvents falls in a range of usually 40% by weight or less, preferably 5 to 40% by weight based on the total amount of the ink composition. If a content of the water-soluble organic solvents exceeds 40% by weight, the drawn lines are less liable to be dried, and therefore it is not preferred.

Further, saccharides and urea derivatives can be used, if necessary, as the humectant. The saccharides include, for example, at least one of reduced sugars comprising maltitol as a principal component, reduced sugars comprising sorbitol as a principal component, reduced oligosaccharide, reduced maltooligosaccharide, dextrin, maltodextrin, reduced dextrin, reduced maltodextrin, α-cyclodextrin, β-cyclodextrin, maltosylcyclodextrin, scarcely-digestive dextrin, reduced starch decomposition products, xylitol, saccharose, maltitol, reduced starch saccharification products and reduced maltose. The urea derivatives include, for example, at least one of urea, ethyleneurea, tetramethylurea, thiourea, ethylene oxide adducts to urea and derivatives thereof.

The above humectants each may be used alone or in combination of two or more kinds thereof.

A content of the humectants such as the above saccharides and urea derivatives is 0.1 to 30% by weight, preferably 0.15 to 15% by weight and more preferably 0.25 to 10% by weight based on the total amount of the ink composition. If this content of the humectants is less than 0.1% by weight, an effect as the humetant is not exhibited. On the other hand, if it exceeds 30% by weight, an increase in the ink viscosity and reduction in the drawn line-drying property are brought about.

In addition to the above, the water-based ink composition according to the present invention can further contain, if necessary, lubricants, preservatives, pH controlling agents, water-soluble alkali-dissolving resins, resin emulsions, corrosion inhibitors, antioxidants and thickeners. The balance is adjusted by water (ion-exchanged water, refined water, distilled water, pure water and extrapure water).

Capable of being given as the lubricant are, for example, fatty acid salts such as potassium linoleate, sodium ricinolate, potassium oleate and sodium oleate and in addition thereto, nonionic, anionic and amphoteric surfactants each shown below. Particularly in the case of a low viscosity ink (about 10 mPa·s), a content thereof is preferably 0.01 to 2.0% by weight, more preferably 0.05 to 1.5% by weight and particularly preferably 0.1 to 1.2% by weight based on the total amount of the ink composition from the viewpoint of the non-feathering property. When the viscosity is 100 to 4000 mPa·s at a shear rate of $3.84\ s^{-1}$ in a non-Newtonian viscosity, the content may not be restricted because of the viscosity effect thereof.

The nonionic surfactants include, for example, polyoxyalkylene higher fatty acid esters, higher fatty acid esters of polyhydric alcohols and derivatives thereof and higher fatty acid esters of sugars, and to be specific, they include glycerin fatty acid esters, polyglycerin fatty acid esters, propylene glycol fatty acid esters, pentaerythritol fatty acid esters, polyoxyethylene sorbitan fatty acid esters, polyoxyethylene sorbit fatty acid esters, polyoxyethylene glycerin fatty acid esters, polyethylene glycol fatty acid esters, polyoxyethylene alkyl ethers, polyoxyethylene styrenated phenyl ethers, polyoxyethylene phytosterol, polyoxyethylene polyoxypropylene alkyl ethers, polyoxyethylene alkylphenyl ethers, polyoxyethylene castor oil, polyoxyethylene lanolin, polyoxyethylene lanolin alcohols, polyoxyethylene alkylamines, polyoxyethylene fatty acid amides and polyoxyethylene alkylphenyl formaldehyde condensation products.

The anionic surfactants include, for example, salts of alkylated sulfonates of higher fatty acid amides and salts of alkyl aryl sulfonates, and to be specific, they include salts of alkylsulfates, salts of polyoxyethylene alkyl ether sulfates, N-acylamino acid salts, N-acylmethyltaurine salts, salts of polyoxyethylene alkyl ether acetates, salts of alkylphosphates and salts of polyoxyethylene alkyl ether phosphates.

The amphoteric surfactants include, for example, alkylbetaines, alkylimidazoliumbetaines and, in addition thereto, aminocarboxylic acid base surfactants.

The preservatives include, for example, phenol, isopropylmethylphenol, sodium pentachlorophenol, benzoic acid, sodium benzoate, dehydroacetic acid, sodium dehydroacetate, sorbic acid, potassium sorbate, sodium 2-pyridinethiol-1-oxide, 1,2-benzoisothiazone-3-one, 5-chloro-2-methyl-4-isothiazone-3-one, 2,4-thiazolinebenzimidazole and paraoxybenzoic acid esters.

The pH controlling agents include amines or bases, for example, various organic amines such as triethanolamine, monoethanolamine and diethanolamine, inorganic alkali agents including alkali metal hydroxides such as sodium hydroxide, lithium hydroxide and potassium hydroxide and ammonia.

The water-soluble alkali-dissolving resins or the resin emulsions are added expecting to work mainly as a viscosity controlling agent and a water resistance-providing agent, and they include, for example, polyvinyl chloride, polyvinylidene chloride, polystyrene, polyethylene, polycarbonate, polymethyl methacrylate, benzoguanamine resins, styrene•acrylonitrile copolymers, acryl•methyl methacrylate•styrene copolymers, alkyl acrylate copolymers, acrylonitrile•alkyl acrylate copolymers, styrene•alkyl acrylate copolymers, styrene•alkyl methacrylate•alkyl acrylate copolymers, styrene•acrylonitrile•alkyl methacrylate•alkyl acrylate copolymers, alkyl methacrylate•alkyl acrylate copolymers, acrylic acid•methacrylic acid•alkyl acrylate copolymers and vinylidene chloride•alkyl acrylate copolymers.

The antioxidants are used mainly in order to inhibit hydrolysis of the ester compounds of the present invention and solve defects caused by gas expansion in a writing instrument such as a ballpoint pen barrel. To be specific, it includes at least one of sodium L-ascorbate, sodium erythorbate, vinylpyrrolidone oligomers, polyphenols such as tocopherol, catechin, flavanegenol, BHT (dibutylhydroxytoluene), BHA (butylhydroxyanisole) and acetylcysteine.

The thickeners are roughly divided into organic thickeners and inorganic thickeners, and acryl base synthetic polymers, natural gum, cellulose and polysaccharides can be used as the organic thickeners. To be specific, they include gum arabic, tragacanth gum, guar gum, locust bean gum, alginic acid, carrageenan, gelatin, casein, xanthan gum, welan gum, succinoglycan, alcalan, dextran, methyl cellulose, ethyl cellulose, hydroxyethyl cellulose, carboxymethyl cellulose, sodium starch glycolate, propylene glycol alginate, polyvinyl alcohol, polyvinylpyrrolidone, polyvinyl methyl ether, poly (sodium acrylate), carboxyvinyl polymers, polyethylene oxide, copolymers of vinyl acetate and vinylpyrrolidone, cross-linking type acrylic acid polymers, swelling associative acryl-emulsions and salts of styrene•acrylic acid copolymers.

The inorganic thickeners include, for example, clays such as smectite, bentonite and diatomaceous earth and fine particles of silicon dioxide.

A content of the above thickeners are suitably increased or decreased according to a viscosity value of the ink.

The corrosion inhibitors include, for example, tolyltriazole, benzotriazole and derivatives thereof, fatty acid phosphorus derivatives such as octyl phosphate and dioctyl thiophosphate, imidazole, benzoimidazole and derivatives thereof, 2-mercaptobenzothiazole, octylmethanesulfonic acid, dicyclohexylammonium•nitrite, diisopropylammonium•nitrite, propargyl alcohol and dialkylthiourea.

The water based ink composition for a writing instrument according to the present invention can be used, for example, for sliver system writing instruments, free ink type writing instruments in which an ink is stored directly in a writing instrument main body and ballpoint pens and fountain pens each equipped with ink reservoirs.

They include, for example, ball point pens equipped with an ink reservoir and a tip holder formed of a material comprising at least one selected from the group consisting of metal materials such as stainless steel, brass and nickel silver and a pen tip having a ball made of a material comprising at least one selected from the group consisting of hard metal, zirconia, silicon carbide and a stainless steel ball and fountain pens equipped with a metal piece or a plastic piece at a pen tip to induce an ink by virtue of capillary force exerted between the metals or between the plastics.

Among the sliver type writing instruments and the free ink type writing instruments described above which are given as the use examples of the present invention, the sliver type writing instruments include sliver type ballpoint pens constituted from a barrel housing a sliver in which the water-based ink composition of the present invention described above is occluded, a feeder connected to the sliver and comprising a fiber bundle and a pen tip comprising a ball and a tip holder and sliver type marking pens comprising an ink-occluding sliver and a pen feed prepared by converging and molding synthetic fibers in a cylindrical form.

Two kinds of the free ink type writing instruments are available, and they include writing instruments constituted from an ink tank for directly storing an ink, an ink holder for temporarily holding the ink so that the ink pressed out from the ink tank when air in the ink tank expands by a rise in the temperature does not fall in blobs from a pen tip (or a pen feed) and an air vent, a ball point pen tip comprising a ball and a tip holder or a pen feed prepared by converging and molding synthetic fibers in a cylindrical form or a fountain pen tip having a pen tip comprising a metal or plastic piece (hereinafter referred to as a direct storage type) and writing instruments constituted from a tube for directly storing an ink, a ball point pen tip comprising a ball and a tip holder or a pen feed prepared by converging and molding synthetic fibers in a cylindrical form or a fountain pen tip having a pen tip comprising a metal or plastic piece (hereinafter referred to as a storage type).

The writing instruments shown above are classified by the viscosity ranges of the inks and used. The inks having a viscosity of 1 to 10 mPa·s are suitably used for a sliver type and a free ink, direct storage type. The inks having a viscosity of 100 to 4000 mPa·s at a shear rate of 3.84 $s^{-1}$ or the inks having a viscosity of 10 to 100 mPa·s in terms of a Newtonian viscosity are used for a free ink storage type writing instrument.

The water-based ink composition for a writing instrument thus constituted contains at least a colorant and water and further contains an alkylene oxide-added glycerin ester in which a principal skeleton is glycerin and 60 to 150 moles of alkylene oxide is added thereto and in which the glycerin is ester-bonded with a carboxylic acid-containing substance in an amount of 0.1 to 30% by weight based on the total amount of the ink composition, whereby the ink physical properties are not changed with the passage of time even after stored for a long period of time; it is excellent in an aging stability; and it is excellent as well in writing feeling, a non-feathering property and a drawn line-drying property.

The action mechanism of the alkylene oxide-added glycerin ester shall be described below in details.

First of all, the alkylene oxide-added glycerin ester used in the present invention makes it possible to improve writing feeling of the writing instrument. In the case of, for example, ballpoint pens, lubricity between a ball and a tip holder and lubricity between paper and the ball contribute to a large extent as factors exerting effects on the writing feeling. Usually, if lubricity between a ball and a tip holder is expected, a content of the above ester has to be increased, but an amount thereof is not required so much for lubricity between the ball and paper. Also in the case of a marking pen and a fountain pen which are equipped with pen feeds, lubricity between paper and an ink discharge part contributes to the writing feeling to a large extent, and therefore the same effect can be expected. A lubricity mechanism between paper and a ball (or a pen feed and the like) is not certain, but it is anticipated that an alkylene oxide chain in a molecule is hydrated with water and that when those molecules are discharged onto a paper surface, they lower force of the hydrogen bond between cellulose fibers to soften paper itself and elevate lubricity thereof with a ball.

A lubricant effect between paper and a ball originates in HLB and an average molecular weight of the alkylene oxide-added glycerin ester. The writing feeling can further be improved by controlling the HLB to preferably 15 to 19.5 and the average molecular weight to 2800 to 10000.

Further, the alkylene oxide-added glycerin ester used in the present invention can improve not only the writing feeling but also the non-feathering property. The water-based ink of the present invention is adhered onto paper by being directly brought into contact with a paper surface by a ballpoint pen, a marking pen and a fountain pen, and therefore a system in which writing is carried out while pushing aside the fibers of paper is taken to increase a capillary radius of paper. Accordingly, the ink-penetrating speed is faster than that of an ink jet system in which an ink is adhered onto a paper surface by jetting droplets and in which an external stress is not applied to paper fibers. Such a high speed is severer for the non-feathering property. In the present invention, the details of the mechanism of the non-feathering property are not clear, but it is anticipated that because of the long alkylene oxide chain present in the molecule of the alkylene oxide-added glycerin ester, the above ester can not penetrate into paper due to the effect of water molecules hydrating to a part of the chain and is present on a paper surface, so that the ink is inhibited from penetrating into the paper surface. Thus, in an ink containing the alkylene oxide-added glycerin ester of the present invention, it is possible to make an amount thereof relatively large, and the non-feathering property and the smooth writing feeling can be satisfied at the same time.

On the other hand, in a pigment ink provided with a non-Newtonian viscosity, for example, an ink to which natural polysaccharides are added, the pigment settles down with the passage of time. In the case of an ink containing the alkylene oxide-added glycerin ester of the present invention, the pigment does not settle down with the passage of time at high temperature, and the ink is stabilized as well in terms of physical properties. The mechanism thereof is not clear, but it is anticipated that hydroxyl groups of natural polysaccharides and an alkylene oxide chain of the alkylene oxide-added glycerin ester construct a network structure and that since the alkylene oxide-added glycerin ester has an adsorbing ability on a pigment, a firm network structure including the pigment is formed. Further, the same shall apply to a case where a colorant is a dye, and a firm network structure of the alkylene oxide-added glycerin ester and a non-Newtonian property-providing agent is formed to stabilize the physical properties.

The writing instrument of the present invention is a writing instrument filled with the water-based ink composition having the constitution described above, for example, a sliver type writing instrument, a free ink type writing instrument and a ballpoint pen and a fountain pen each equipped with ink reservoirs, which are filled with the above ink composition. The writing instrument is one in which ink physical properties are not changed with the passage of time even after stored for a long period of time and which is excellent in an aging stability and also excellent in writing feeling, a non-feathering property and a drawn line-drying property.

EXAMPLES

Next, the present invention shall be explained in further detail with reference to examples and comparative examples, but the present invention shall not be restricted to the examples described below.

Examples 1 to 13 and Comparative Examples 1 to 6

Compounds having the respective physical properties (average molecular weight, HLB and esterification degree) shown in Table 1 described below were used as alkylene oxide-added glycerin esters and the like. The HLB was calculated from the Griffin's equation described above.

Next, the respective water-based ink compositions for a writing instrument were obtained according to the respective formulations shown in Table 2 and Table 3 described below.

The respective water-based ink compositions for a writing instrument thus obtained were measured for an ink viscosity and pH by the following measuring methods.

Next, writing instruments having the following specifications were charged with the respective water-based ink compositions for a writing instrument obtained above.

(1) Free ink direct storage type ballpoint pen (UB-157, ball diameter φ:0.7 mm; manufactured by Mitsubishi Pencil Co., Ltd.): Examples 1, 3 to 6 and 11 to 13 and Comparative Examples 1 and 3

(2) Sliver type marking pen (PM-150; manufactured by Mitsubishi Pencil Co., Ltd.): Examples 8 to 10 and Comparative Example 2

(3) Free ink storage type ballpoint pen (UM-100, ball diameter φ:0.7 mm; manufactured by Mitsubishi Pencil Co., Ltd.): Examples 2 and 7 and Comparative Example 4

Each five writing instruments having the specifications described above were assembled in the examples and the comparative examples described above, and they were evaluated for feathering (non-feathering property), writing feeling, a drawn line-drying property and an aging stability.

The results thereof are shown in Tables 2 and 3 described below.

Measuring Method of Ink Viscosity:

The ink viscosity was measured at a measuring temperature of 25° C. by means of a measuring device: an ELD•EMD type viscometer manufactured by Tokimec Inc.

Measuring Method of pH:

The ink pH was measured at a measuring temperature of 25° C. by means of a pH meter manufactured by HORIBA, Ltd.

Evaluation Method of Feathering:

Japanese characters [Mitsubishi Pencil] were written on manuscript paper, and the feathering property was sensorily evaluated according to the following evaluation criteria.

Evaluation Criteria:
 ◎: no feathering observed
 ○: a little feathering observed but no problems in terms of actual use
 Δ: feathering was caused, but even when small characters were written, the characters are not defaced
 ΔΔ: characters were slightly defaced
 X: characters were defaced and illegible Evaluation Method of Writing Feeling:

Spiral lines and the Japanese characters [Mitsubishi Pencil] were written on manuscript paper, and the writing feeling was evaluated according to the following evaluation criteria.

Evaluation Criteria:
 ◎: both the spiral lines and the Japanese characters [Mitsubishi Pencil] were written well, and even when a pen tip for fine characters was used, the writing feeling was good
 ○: the writing feeling became a little bad as compared with ◎ described above but no problems in terms of actual use
 Δ: the writing feeling was felt heavy in writing the Japanese characters [Mitsubishi Pencil], but the spiral lines were written well
 ΔΔ: the writing feeling was heavy in writing both the spiral lines and the Japanese characters [Mitsubishi Pencil], but the drawn lines were good
 X: the writing feeling was heavy, and broken line parts were produced on the drawn lines Evaluation Method of Drawn Line-Drying Property:

The Japanese characters [Mitsubishi Pencil] were written on PPC paper, and the drawn line-drying property was evaluated according to the following evaluation criteria.

Evaluation Criteria:
 ◎: the ink was not smeared to a finger after 10 seconds since written
 ○: the ink was not smeared to a finger after 30 seconds since written
 Δ: the ink was not smeared to a finger after 60 seconds since written
 ΔΔ: the ink was smeared to a finger even after 60 seconds passed since written
 X: the ink was smeared to a finger even after 300 seconds passed since written Evaluation Method of Aging Stability:

The water-based ink compositions obtained which were filled into a pen and a transparent vessel (bulk) equipped with a plate cover were left standing at 50° C. for one month, and the aging stability was evaluated according to the following evaluation criteria.

Evaluation Criteria:
 ◎: both the pen performance and the bulk storage were stable
 ○: a viscosity tended to be increased a little in the bulk storage, but the pen performance had no problems
 Δ: the pen performance was reduced as compared with that in the beginning and an increase in a viscosity in the bulk storage but no problems in terms of actual use
 ΔΔ: starving was generated in the pen performance test
 X: the ink was gelatinized

TABLE 1

| Alkylene oxide-added glycerin esters | Molecular weight | HLB | Esterification degree (ester number/hydroxyl group number) |
|---|---|---|---|
| A: triglycerin EO (80) stearic acid (2) ester | 4293 | 17.3 | 0.40 |
| B: diglycerin EO (100) palmitic acid (2) ester | 5043 | 18.0 | 0.50 |
| C: diglycerin EO (100) oleic acid (2) ester | 5095 | 17.8 | 0.50 |
| D: diglycerin EO (85) benzoic acid (2) ester | 4114 | 18.8 | 0.50 |
| E: glycerin EO (80) lauric acid (1) ester | 3794 | 18.9 | 0.33 |
| F: Y = 10 glycerin EO (60) lauric acid (4) ester | 4127 | 16.1 | 0.33 |
| G: Y = 11 glycerin EO (85) lauric acid (4) ester | 5301 | 17.0 | 0.31 |
| H: triglycerin EO (150) palmitic acid (2) ester | 7317 | 18.6 | 0.40 |
| I: diglycerin EO (100) butyric acid (2) ester | 4706 | 19.3 | 0.50 |
| J: diglycerin PO (100) tridecylic acid (2) ester | 6386 | 18.6 | 0.50 |
| K: tetraglycerin EO (80) lauric acid (1) ester | 4016 | 19.0 | 0.17 |
| L: tetraglycerin EO (80) lauric acid (5) ester | 4746 | 15.8 | 0.83 |
| M: glycerin EO (40) stearic acid (1) ester | 2118 | 17.3 | 0.33 |
| N: diglycerin EO (300) palmitic acid (2) ester | 13917 | 19.3 | 0.40 |
| O: diglycerin EO (100) | 4566 | 20.0 | 0 |
| P: hexaglycerin monolaurate | 644 | 13.8 | 0.13 |

TABLE 2

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Colorants: | | | | | | | | | | | | | |
| Carbon black*1 | | | 7 | | | | | | | | | | 5 |
| Water black LM*2 | 5 | 5 | | | | | | | | | 5 | 5 | |
| Naphthol Red*3 | | | | | 8 | | | | | | | | |
| Phthalocyanine Blue*4 | | | | 8 | | | | | | | | | |
| Eosine*5 | | | | | | 5 | | 5 | 5 | 5 | | | |
| DPP*6 | | | | | | | 7 | | | | | | |
| Solvents: | | | | | | | | | | | | | |
| Ethylene glycol | 20 | 20 | 10 | | 10 | 20 | 10 | 10 | 10 | 10 | 20 | 20 | 10 |
| Propylene glycol | | | 15 | | | | 10 | 10 | 10 | 10 | | | 15 |
| Glycerin | | | | 10 | 10 | | 5 | | | | | | |
| Diethylene glycol | | | | 15 | | | | | | | | | |
| pH controlling agents: | | | | | | | | | | | | | |
| TEA*7 | 0.3 | 0.3 | 0.3 | 0.3 | 0.3 | 0.3 | 0.3 | 0.3 | 0.3 | 0.3 | 0.3 | 0.3 | 0.3 |
| AMP*8 | 0.1 | 0.1 | 0.1 | | | 0.1 | 0.1 | 0.1 | 0.1 | 0.1 | 0.1 | 0.1 | 0.1 |
| Preservative: Proxel BDN*9 | 0.1 | 0.1 | 0.1 | 0.1 | 0.1 | 0.1 | 0.1 | 0.1 | 0.1 | 0.1 | 0.1 | 0.1 | 0.1 |
| Rust preventive: benzotriazole | 0.3 | 0.3 | 0.1 | 0.3 | 0.1 | 0.2 | 0.3 | 0.3 | 0.3 | 0.3 | 0.3 | 0.3 | 0.1 |
| Lubricant: phosphoric acid ester*10 | 0.3 | 0.3 | 0.5 | 0.3 | 0.5 | 0.2 | 0.5 | 0.2 | 0.2 | 0.2 | 0.3 | 0.3 | 0.5 |
| Thickener: xanthan gum | | 0.4 | | | | | 0.34 | | | | | | |
| Saccharides: | | | | | | | | | | | | | |
| Glucose | 2 | 2 | | | 3 | | 1 | | | 1 | 2 | 2 | |
| Mannose | | | | 3 | | 3 | | | 1 | | | | |
| Urea | | | 1.5 | | | | | 1 | | | | | |
| Alkylene oxide-added glycerin ester (Table 1) | A | B | C | D | E | F | G | H | I | J | K | L | A |
| | 1.5 | 3.0 | 1.0 | 2.5 | 2.5 | 1.5 | 1.5 | 0.5 | 1.5 | 1.0 | 1.5 | 1.5 | 1.5 |
| Refined water | | | | | | | Balance | | | | | | |
| Viscosity: | | | | | | | | | | | | | |
| 1 rpm | | 1500 | | | | | 1320 | | | | | | |
| 50 rpm | 3.4 | 232 | 3.8 | 4.7 | 4.5 | 6.0 | 234 | 6.0 | 3.5 | 3.4 | 4.2 | 4.8 | 3.0 |
| Ink pH | 8.5 | 8.5 | 8.5 | 7.5 | 7.5 | 8.5 | 8.5 | 8.5 | 8.5 | 8.5 | 8.5 | 8.5 | 8.5 |
| Evaluation: | | | | | | | | | | | | | |
| Feathering | ○ | ◎ | ◎ | ◎ | △ | ◎ | ◎ | △ | ◎ | △ | ○ | △ | ◎ |
| Writing feeling | ◎ | ◎ | ◎ | ◎ | ◎ | ○ | ◎ | ○ | ◎ | ◎ | ○ | ○ | ◎ |
| Drawn line-drying property | ◎ | ◎ | ○ | ○ | ◎ | ○ | △ | ◎ | △ | ◎ | △ | ○ | ○ |
| Aging stability | ◎ | ◎ | ◎ | ○ | ○ | ○ | △ | ○ | ○ | ○ | ○ | ○ | △ |

TABLE 3

| | Comparative Examples | | | | | |
|---|---|---|---|---|---|---|
| | 1 | 2 | 3 | 4 | 5 | 6 |
| Colorants: | | | | | | |
| Carbon black*1 | | | 7 | 7 | | |
| Naphthol Red*3 | 8 | | | | | |
| Eosine*5 | | 5 | | | 5 | 5 |
| Solvents: | | | | | | |
| Ethylene glycol | 10 | 10 | 10 | 10 | 10 | 10 |
| Propylene glycol | | 10 | 15 | 15 | 15 | 15 |
| Glycerin | 10 | | | | | |
| pH controlling agents: | | | | | | |
| TEA*7 | 0.3 | 0.3 | 0.3 | 0.3 | 0.3 | 0.3 |
| AMP*8 | | 0.1 | 0.1 | 0.1 | 0.1 | 0.1 |
| Preservative: Proxel BDN*9 | 0.1 | 0.1 | 0.1 | 0.1 | 0.1 | 0.1 |
| Rust preventive: benzotriazole | 0.1 | 0.3 | 0.1 | 0.1 | 0.1 | 0.1 |
| Lubricant: phosphoric acid ester*10 | 0.5 | 0.2 | 0.5 | 0.5 | 0.5 | 0.5 |
| Thickener: xanthan gum | | | | 0.34 | | 0.34 |
| Saccharides: | | | | | | |
| Glucose | 3 | | | | | |
| Mannose | | | | | | |
| Urea | | 1 | 1.5 | 1.5 | 1.5 | 1.5 |

TABLE 3-continued

|  | Comparative Examples | | | | | |
| --- | --- | --- | --- | --- | --- | --- |
|  | 1 | 2 | 3 | 4 | 5 | 6 |
| Alkylene oxide-added glycerin ester (Table 1) | M 2.5 | N 1.0 | O 2.0 | P 2.0 | O 2.0 | P 2.0 |
| Refined water |  |  | Balance | | | |
| Viscosity: | | | | | | |
| 1 rpm |  |  | * | * |  | 1460 |
| 50 rpm | 4.5 | 7.5 |  |  | 3.5 | 214 |
| Ink pH | 7.3 | 8.5 | — | — | 8.4 | 8.4 |
| Evaluation: | | | | | | |
| Feathering | ΔΔ | ○ | — | — | ⊚ | Δ |
| Writing feeling | ΔΔ | ⊚ | — | — | ⊚ | ΔΔ |
| Drawn line-drying property | ⊚ | ΔΔ | — | — | ΔΔ | ○ |
| Aging stability | X | ΔΔ | — | — | ○ | ○ |

* gelation in dispersing

*1 to *10 in Table 2 and Table 3 described above mean the followings:

*1: Carbon Black MA-100 (manufactured by Mitsubishi Chemical Corporation)

*2: Water Black 187LM (manufactured by Orient Chemical Industries Ltd.)

*3: Sumitone Scarlet (manufactured by Sumitomo Chemical Co., Ltd.)

*4: Chromofine Blue 4927 (manufactured by Dainichiseika Color & Chemicals MFG. Co., Ltd.)

*5: Red No. 103 (manufactured by Daiwa Fine Chemicals Co., Ltd.)

*6: diketopyrrolopyrrole: Irgalite DPP BT-R (manufactured by Ciba Specialty Chemicals Co., Ltd.)

*7: triethanolamine

*8: aminomethylpropanol

*9: 2-benzisothiazoline-3-one (manufactured by Zeneca Co., Ltd.)

*10: polyoxyethylene alkyl ether phosphoric acid ester (manufactured by Dai-Ichi Kogyo Seiyaku Co., Ltd.)

As apparent from the results shown in Table 1 to Table 3 described above, it has been found that the ink compositions prepared in Example 1 to 13 falling in the scope of the present invention are excellent in a non-feathering property, writing feeling, a drawn line-drying property and aging stability as compared with those prepared in Comparative Examples 1 to 6 falling outside the scope of the present invention.

The ink compositions for a writing instrument prepared in Example 1 to 13 falling in the scope of the present invention are compositions containing an alkylene oxide-added glycerin ester in which a principal skeleton is glycerin and 60 to 150 moles of alkylene oxide is added thereto and in which the glycerin is ester-bonded with a carboxylic acid-containing substrate. Accordingly, they have excellent performances in a non-feathering property, writing feeling, a drawn line-drying property and aging stability, and it has been found that even the low viscosity ink can exhibit the effects of the present invention as is the case with Example 1.

In contrast with this, to individually observe the comparative examples, in Comparative Example 1, the improvement levels of the non-feathering property and the writing feeling are not so high because of a small addition number of ethylene oxide, and gelation of the ink occured with the passage of time; in Comparative Example 2, the drawn line-drying property and the aging stability are inferior because of a large addition number of ethylene oxide; in Comparative Examples 3 to 6, the effects of the present invention can not be exerted by an ethylene oxide 100 mole adduct of diglycerin and hexaglycerin monolaurate which fall outside the scope of the present invention.

What is claimed is:

1. A ballpoint pen filled with a water-based ink composition comprising at least a colorant, water, an organic solvent and an alkylene oxide-added glycerin ester in which a principal skeleton is glycerin and 60 to 150 moles of alkylene oxide is added thereto and in which the glycerin is a polyglycerin having a polymerization degree of 2 to 8 and ester-bonded with a carboxylic acid-containing substance, wherein each of the organic solvent and the alkylene oxide-added glycerin ester is present in an amount of 0.1 to 30% by weight based on the total amount of the ink composition,
    wherein the ballpoint pen has a single ink.

2. The ballpoint pen as described in claim 1, wherein the alkylene oxide-added glycerin ester has an average molecular weight of 2800 to 10000.

3. The ballpoint pen as described in claim 1, wherein the alkylene oxide-added glycerin ester has an HLB of 15 to 19.5.

4. The ballpoint pen as described in claim 1, wherein the carboxylic acid-containing substance is a fatty acid having 4 to 25 carbon atoms or an aromatic carboxylic acid.

5. The ballpoint pen as described in claim 1, wherein the alkylene oxide in the alkylene oxide-added glycerin ester is ethylene oxide.

6. The ballpoint pen as described in claim 1, wherein in the alkylene oxide-added glycerin ester, X/(Y+2) is 0.25 to 0.75, wherein X is a number of molecules of the carboxylic acid-containing substance bonded to the glycerin, and Y is a polymerization degree of glycerin.

7. The ballpoint pen as described in claim 1, wherein the water-based ink composition contains saccharides of 0.1 to 30% by weight based on the total amount of the ink composition.

* * * * *